Jan. 4, 1927.                                  1,612,800
                     N. H. BROCK
METHOD FOR THE CONVERSION OF CONICAL PROJECTIONS TO ORTHOGRAPHIC PROJECTIONS
              Filed June 23, 1925       2 Sheets-Sheet 1
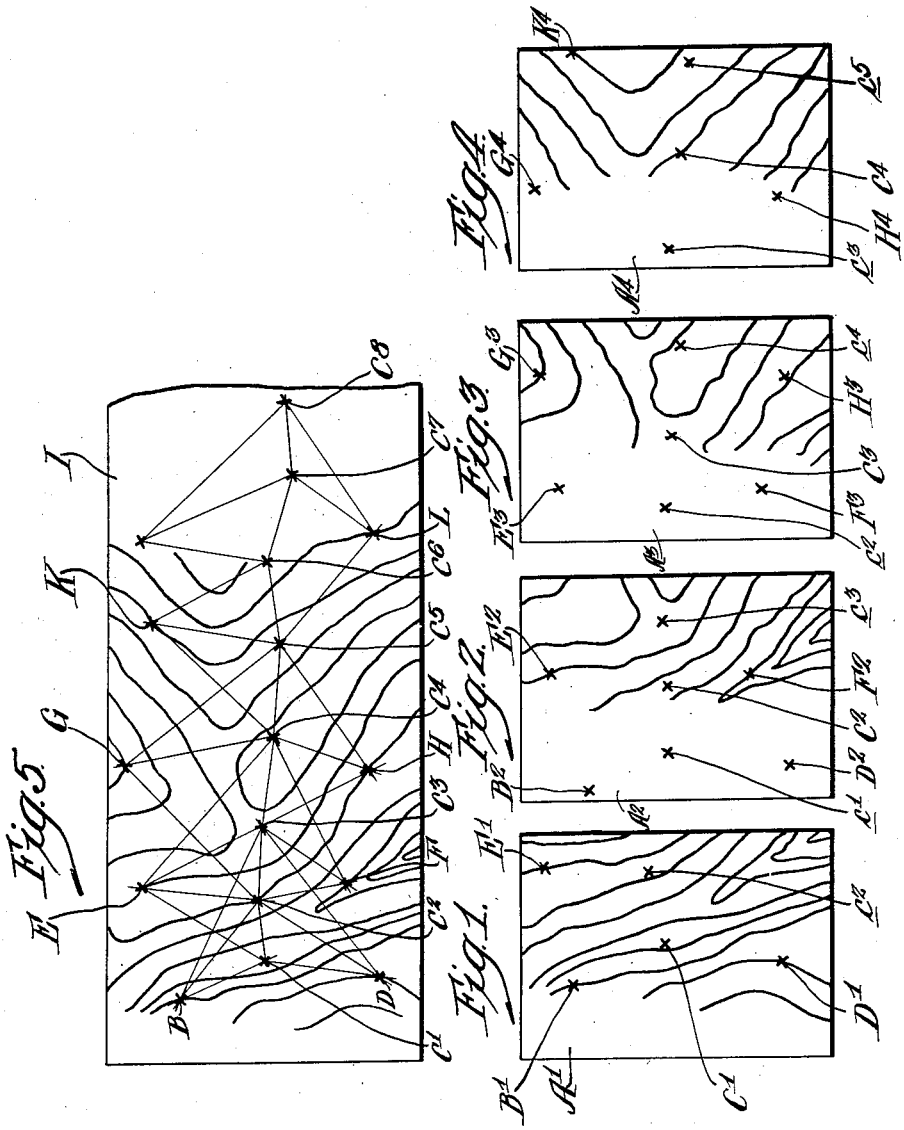
Inventor
Norman H. Brock.
by Francis D. Chalmers
his Attorney.

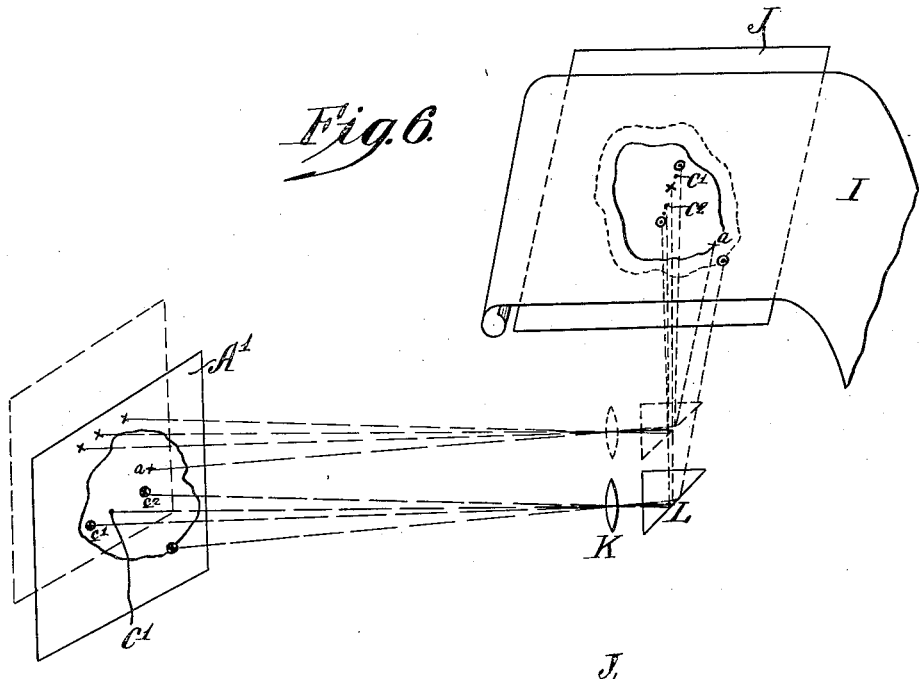

Patented Jan. 4, 1927.

1,612,800

UNITED STATES PATENT OFFICE.

NORMAN H. BROCK, OF PHILADELPHIA, PENNSYLVANIA, ASSIGNOR TO BROCK & WEYMOUTH, INCORPORATED, OF PHILADELPHIA, PENNSYLVANIA, A CORPORATION OF DELAWARE.

METHOD FOR THE CONVERSION OF CONICAL PROJECTIONS TO ORTHOGRAPHIC PROJECTIONS.

Application filed June 23, 1925. Serial No. 38,983.

My invention relates to a method for correctly locating on an orthographically prepared traverse of salient points, (including the optical center-points shown on aerial photographs) the contour lines and points showing on the photographic plates, on the scale of the traverse and, generally speaking, my new method consists in projecting a contoured photographic plate on the traverse so that the optical center of the plate so projected coincides with its location on the traverse and so that a line drawn from the center of the plate to a second selected salient point will coincide with the line connecting the same point on the traverse, then adjusting the scale of projection until the second salient point on the projection coincides with its located position on the traverse and drawing the contour line passing through this point and other points adjacent to it, on the traverse and then changing the scale of projection of the photograph to correspond with the known difference of elevation between the contour line so drawn and another contour line on the plate, and tracing the so located second contour line on the traverse.

Where, as is generally the case, an orthographic map is to be prepared from a series of overlapping photographic views on portions of which contour lines have been drawn, my method further involves preparing a traverse of the territory shown in the series of views by known methods, and locating on said traverse points corresponding to the optical center points of the contoured plates and one or more other salient points occurring on each plate and then tracing on the traverse the contour lines of each plate in the way above described.

It is a fact that a photographic view of object points all located in the same horizontal plane is identical in form with a view of the same object points in orthographic projections, consequently the form of a contour line on an orthographic map will be the same as that traced on a photographic plate. Since, however, the successive contour lines rise nearer and nearer to the lens, each higher contour level will have been photographed on a larger scale than the preceding one. It is thus only necessary to reduce the actual scale of the higher contours to the scale adopted for the datum plane in order to present each coutour in the correct size and form to fit the orthographic map drawing. Methods by means of which selected points occurring in pairs of photographic views of the ground can be properly located in orthographic projections on a traverse constructed from such photographs are well known. It will thus be understood that when a coutour line containing one of such points be projected in such a scale that the photographic image thereof coincides in position with the plotted location, all other points in the same contour will be projected in their correct orthographic locations and can then be traced in on the map tracing in their proper relative positions.

My invention will be best understood as described in connection with the drawings, in which:

Figures 1 to 4 are perspective views of a series of photographic plates taken with overlapping views, having say about 60% overlap so that the center points of each overlap show on the adjoining plates. On each of these plates the contour lines of the territory lying between the center of the plate and the conjugate center point of the next succeeding plate are traced.

Figure 5 is a view showing the orthographic map made on tracing cloth from the photographic views by my method.

Figure 6 is a diagrammatic view illustrating my method of projecting the contour lines in corrected scale on the map drawing, and Figure 7 is a diagrammatic side elevation of an apparatus designed for the convenient practice of my invention by means of an automatic focusing camera.

$A^1$, $A^2$, $A^3$ and $A^4$ are the photographic plates, on each of which is indicated the center point of the plate indicated at $C^1$, $C^2$, $C^3$ and $C^4$ and the conjugate center points of the adjoining plates indicated at $c^1$, $c^2$, $c^3$ and $c^4$. $B^1$, $D^1$, are salient points showing on plate $A^1$ their conjugate image points on plate $A^2$ being indicated at $B^2$, $D^2$; $E^2$, $F^2$ are similar points in plate $A^2$; their conjugate image points on adjoining plates being indicated at $E^3$, $F^3$ and $G^3$, $H^3$ are similar points in plate $A^3$, their conjugate points showing at $G^4$ and $H^4$; I is the orthographic map prepared from the plates, preferably on tracing cloth. The basis of this map is a traverse prepared from the photographs by known means, on which the center points on each plate spaced by a fixed scale and the line of flight of the aeroplane between the positions in which successive photographs were taken is correctly indicated, as are also at least four salient points showing in each view. The method of taking, correcting and contouring plates and of preparing a traverse and map therefrom is fully described in the Brock and Holst Patent No. 1,565,413 of December 15, 1925. See particularly pages 7 and 8 of the printed patent. My invention may be considered as an improvement on the method described in said patent whereby the operation of contouring the map is speeded and cheapened.

J, Figs. 6 and 7, is a glass tracing table. K is the lens of a projecting camera. L is a right angle reflector, a prism as shown in M, Fig. 7, is the base of an automatic focusing camera having uprights $M^1$ which support the glass table top J and a horizontal projection $M^2$. $M^3$ is a vertical slot or guideway. N is a support for the camera having a horizontal extension $N^1$ and supporting rollers $N^2$. O, O are wedge shaped supports movable on the extension $M^2$ and upon which rest the rollers $N^2$. P is a support for the light box and plate support $P^2$ supported by rollers $P^1$ on the extension $N^1$. $P^3$ is the lamp. Q is a slide vertically movable in guideway $M^3$ and having a pivot pin $Q^1$ on which is secured a sleeve $Q^2$. Through this sleeve $Q^2$ passes a single armed lever R fulcrumed at $R^1$, which at its lower end passes through a sleeve $S^1$ pivotally supported at S to a point on the support P. T, $T^1$ indicate the usual light excluding bellows.

The automatic focusing camera indicated in Fig. 7 has been devised for use in carrying my method into practical use and embodies certain novel features which form the subject matter of an application for Letters Patent filed by Lodewyk J. R. Holst dated June 23, 1925, Serial Number 39,002.

In practicing my invention a series of overlapping photographic views of the territory to be mapped, preferably reprojected to make them correspond to views taken with a vertical lens axis and on which have been traced contour lines of the territory shown in the views, are used to prepare a traverse on which are shown the center points of each plate, spaced to the scale of the traverse and connected by lines which indicate the direction of flight between each two successive points and on this traverse I also properly locate at least four other salient points in each plate. The traverse so prepared and preferably on tracing cloth is then laid on the glass table top, and a plate $A^1$, for example, is placed in the plate support of the camera and the traverse is adjusted on the table so that the center point of the plate is projected on the same point as located on the traverse and so that a line connecting the center point of the plate with the conjugate center $c^2$ of the succeeding plate will correspond with the line $C^1$, $C^2$ of the traverse. I then shift the plates away from or towards the lens, as it may be necessary to reduce or enlarge the scale of the contour line until the projected contour line passing through one of the salient points of plate $A^1$ is brought to register with this point as located on the traverse.

This brings the projected image of the contour line to the scale of the traverse and it can be traced on the traverse as so located. The height of the selected point being known and the difference in elevation of all the contour lines being also known, it is a simple matter to readjust the plate with regard to the lens by distances which will correspond to the difference in elevation between contour lines and results in each contour line being in turn projected on the tracing in the scale of the tracing. Each successive plate is in turn projected on the traverse tracing and as a result a correct map is rapidly produced.

It is of course necessary that with each scale adjustment of the camera it be refocused and the focal plane corresponding to the top of the glass table top must remain fixed for all scale adjustment. This can be effected in various ways but is very efficiently effected by the projector constructed as shown in Fig. 7.

In this projector when adjusted to project a view on the tracing in the same scale as that of the plate, the single armed lever should be at an angle of 45° to the vertical, and when it is desired to reduce the scale of the projected view the wedges O are moved to the left with the effect of lifting the camera support N and all parts supported by it. This of course lifts the pivoted sleeve $Q^2$ and turns the lever R on its fulcrum so that the lower end passing through sleeve $S^1$ moves the plate to the correct distance from the lens, to maintain the focal plane of the image in the top surface of the traverse-supporting surface.

Having now described my invention, what I claim as new and desire to secure by Letters Patent is:

1. The method of converting the conical projection of an aerial photographic view into the orthographic projection of a map which consists in preparing a contoured plate of said view and in preparing a geometrically constructed traverse in orthographic projection of two or more selected points occurring in said contoured view and including the optical center thereof, projecting the image of the contoured plate on the traverse drawing by means of a suitable projecting camera, bringing the projected optical center in coincidence with the plotted position thereof on the drawing, adjusting the drawing with reference to the projected view until a line connecting the center and a selected point as projected coincides in direction with the direction between the corresponding points as plotted on the traverse; changing the scale of the projection until the selected point as projected coincides in location with the plotted location thereof; drawing on the traverse the contour line passing through this selected point and points adjacent thereto, then changing the scale of the projection in conformity with the known difference in elevation between the contour line so drawn and the contour line next to be drawn, repeating the scale of adjustments of the projection successively for each contour line and drawing these when so adjusted, until completion of the orthographic drawing of said view.

2. The method of claim 1 as applied to the making of a composite map in orthographic projection of the aggregate area included in a continuous series of photographic views taken so as to constitute a series of overlapping pairs of plates on each of which is shown the conjugate center point of the other member of the pair and on one plate of each such pair are traced the contour lines of the section lying between its center and the conjugate center of the other plate of the pair, characterized by producing by geometric construction a traverse in orthographic projection of selected points occurring on said contoured plates including the optical center of each plate of the series, then successively projecting each contoured plate on the traverse and drawing thereof the contour lines as set out in claim 1, and aligning each successive contoured plate in relation to the previously traced drawing of the preceding view so that the projected direction of the line uniting the optical center of the successive view with that of the preceding view will coincide with the plotted direction of this line as shown on the traverse.

NORMAN H. BROCK.